July 6, 1943.　　　N. C. CLARK　　　2,323,794
SEAT CONSTRUCTION
Original Filed March 31, 1938　　4 Sheets-Sheet 1
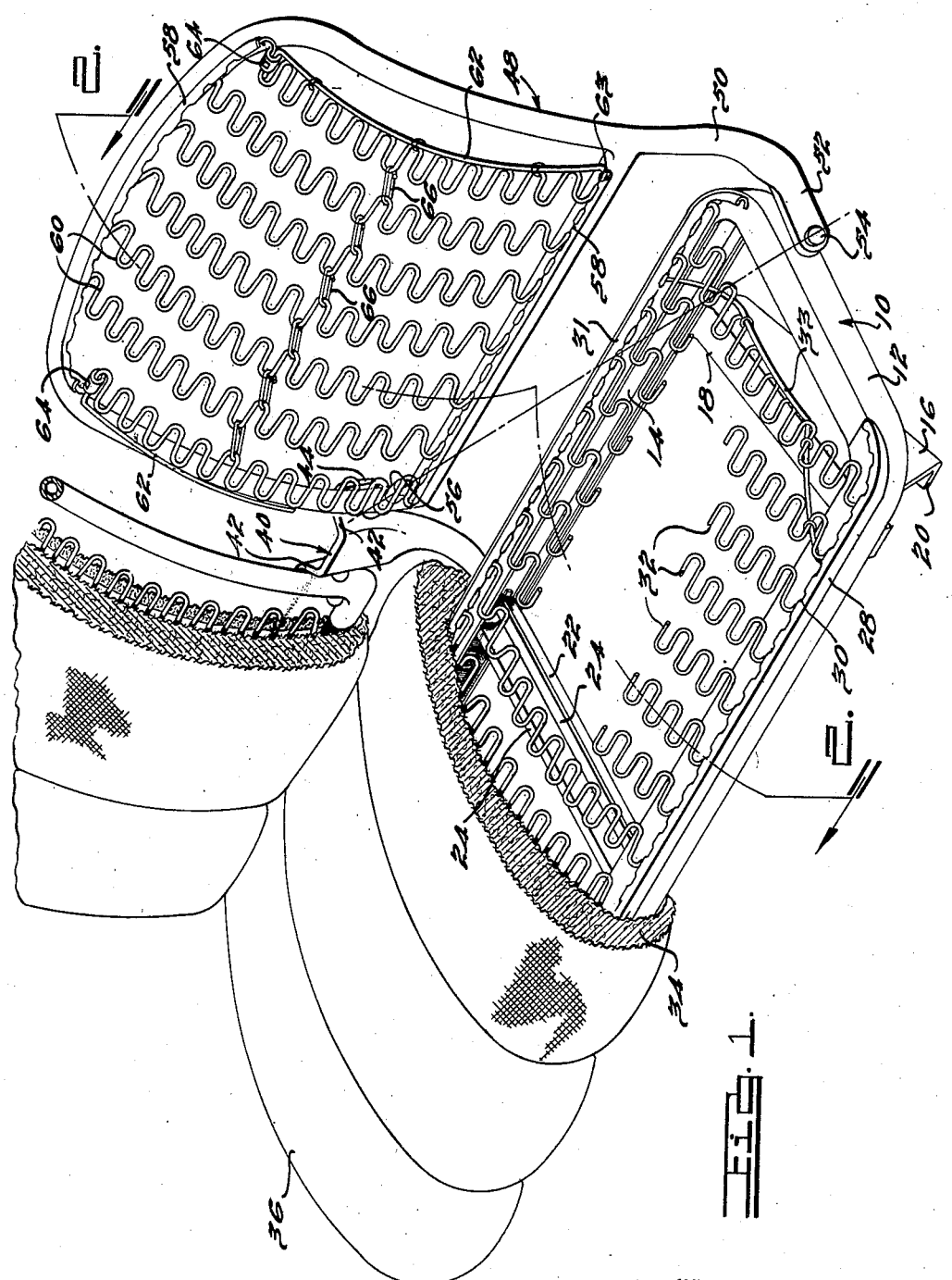
INVENTOR
NOBLE C. CLARK
BY
Harness, Dickey & Pierce.
ATTORNEYS.

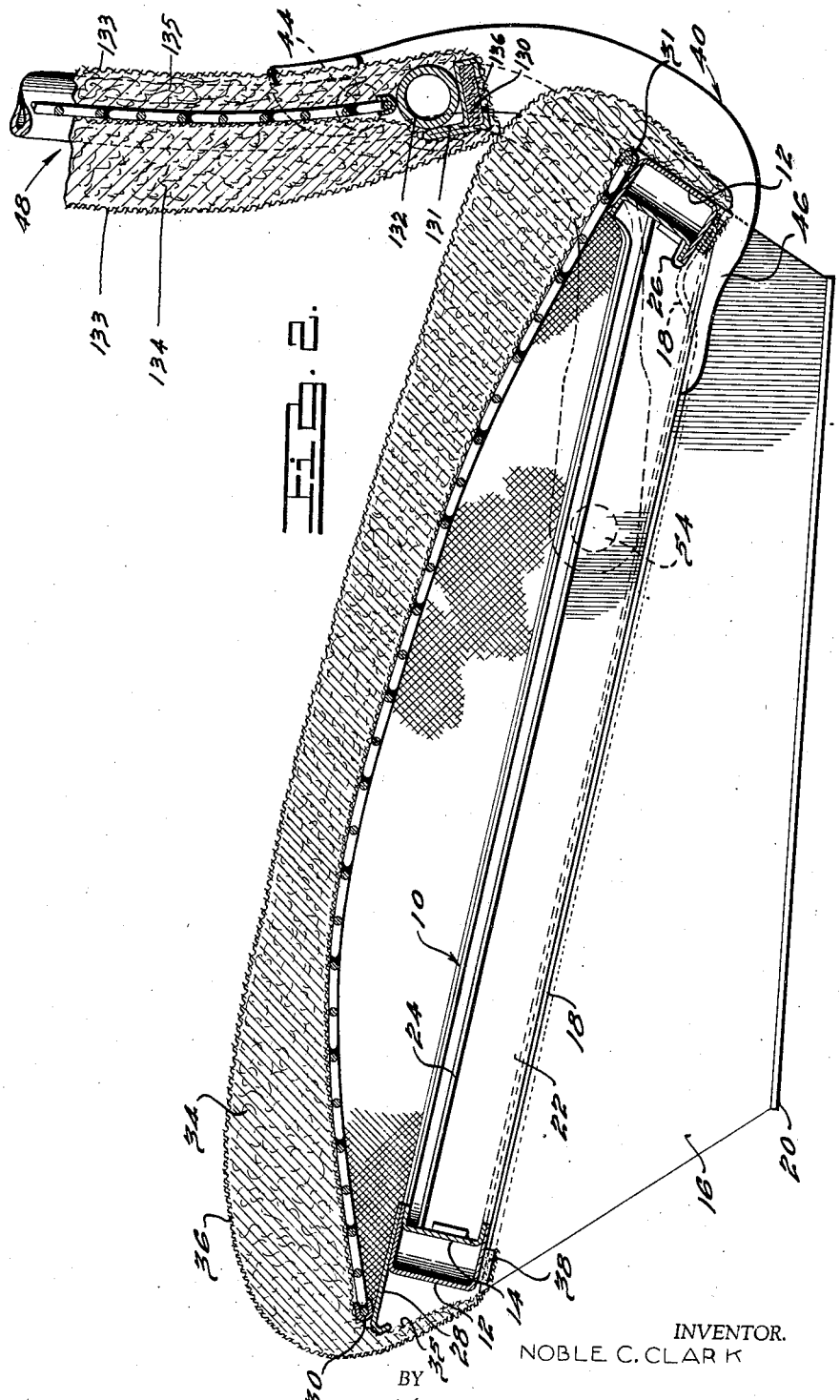

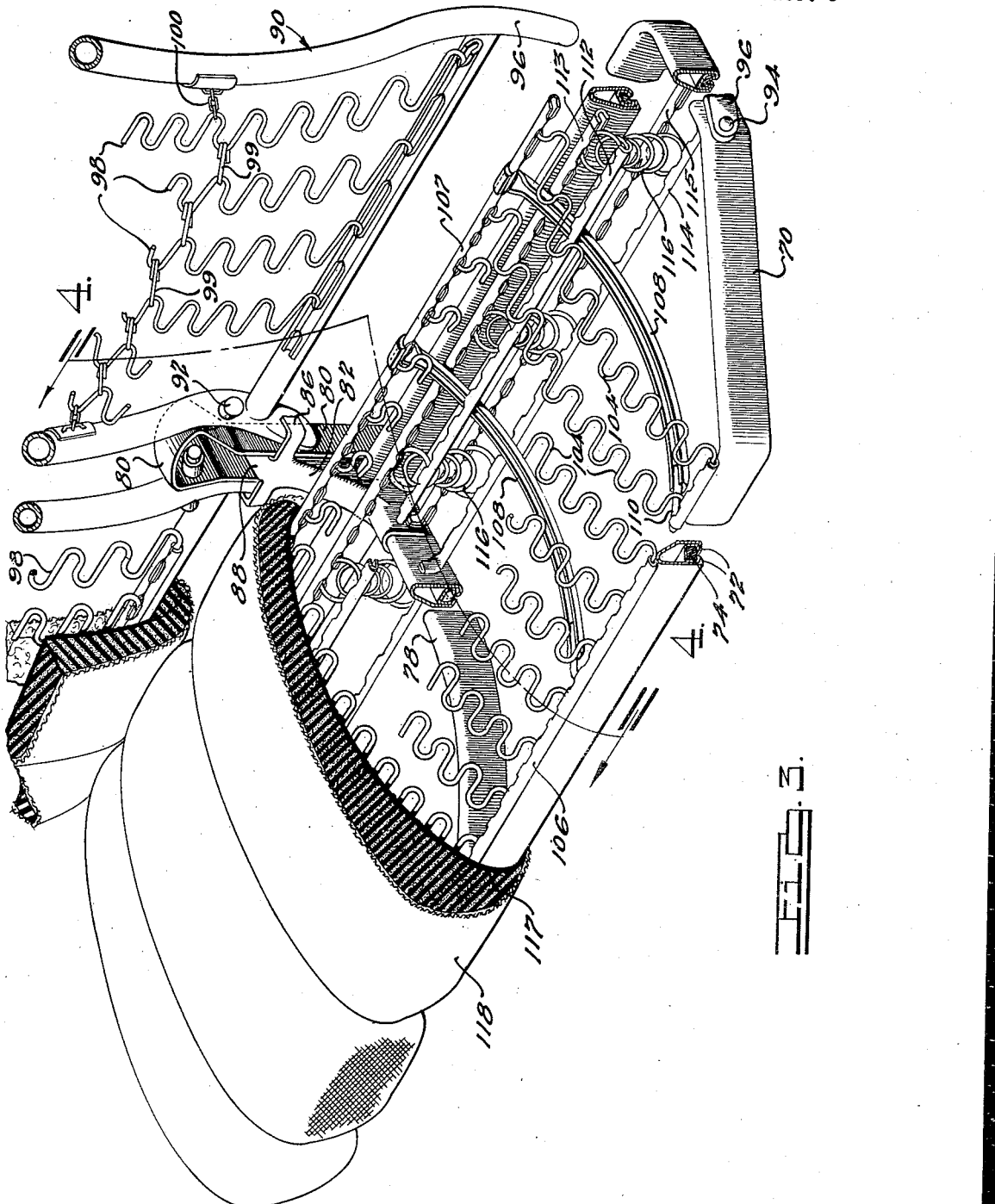

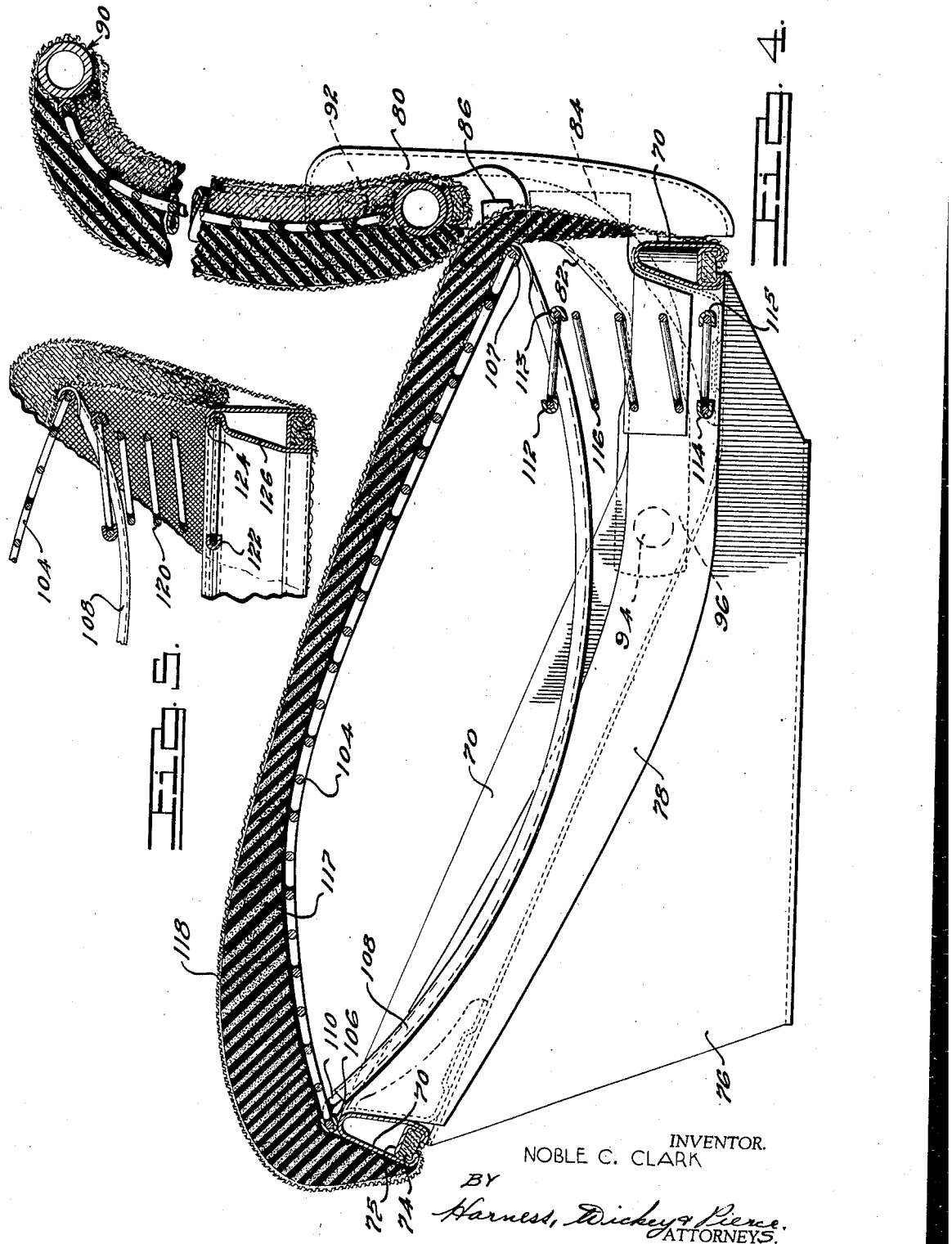

Patented July 6, 1943

2,323,794

UNITED STATES PATENT OFFICE 2,323,794

SEAT CONSTRUCTION

Noble C. Clark, Ferndale, Mich., assignor to The Murray Corporation of America, Detroit, Mich., a corporation of Delaware Original application March 31, 1938, Serial No. 199,230. Divided and this application July 31, 1940, Serial No. 349,030

2 Claims. (Cl. 155—179)

This application is a division of application, Serial No. 199,230, filed March 31, 1938, for Seat construction, the claims of which are the sole invention of the present applicant.

The present invention relates to seat constructions of a type particularly suited for use in automobiles.

One object of the invention is to provide an improved seat construction for use in so-called "two door sedans" wherein it is necessary to tilt the back of a front seat forwardly in order to gain access to the rear seats. More specifically it is an object of the present invention to provide an improved means for pivotally mounting a seat back which will enable the seat back to be pivoted out of the path of passengers entering the back seat of a two door sedan to a greater extent than is possible with prior constructions.

Another object of the invention is an improved seat construction which is soft and resilient but in which the seating surface cannot have any substantial horizontal movement relative to the seat frame.

Another object of the invention is to provide an improved seat construction of the type having the seating and back surface upholstery and padding supported by a plurality of sinuous spring elements.

A further object of the invention is to provide an improved means for preventing relative lateral movement between the sinuous spring elements which support the seat and back padding or upholstery.

Other objects of the invention, which include the provision of improved details of construction, will become apparent from the following specification and the accompanying drawings.

In the drawings:

Figure 1 is a perspective view of the seat with parts broken away to show the interior construction;

Fig. 2 is a sectional view taken on the line 2—2 of Fig. 1;

Fig. 3 is a perspective view with parts broken away showing another form of the invention;

Fig. 4 is a sectional view taken on the line 4—4 of Fig. 3;

Fig. 5 is a sectional view corresponding to Fig. 4 but showing a modified form of the construction.

Referring to Figs. 1 and 2 there are shown a two-passenger front seat construction particularly adapted for use in enclosed automobiles of the two door sedan type. The seat comprises a main frame indicated generally at 10 formed of a pair of rolled channel members 12 and 14 nested together and extending entirely around the margin of the seat. The frame 10 is supported at its ends upon a pair of supporting stampings 16 each provided with a top flange 18 secured in any suitable manner, as by welding, to the under side of the frame 10 and with a bottom flange 20 adapted to rest upon the floor of the vehicle or any suitable support. The frame is reinforced by a central longitudinally extending generally U-shaped frame member 22 having outwardly extending flanges 24 at the top edges of the U. The forward end of member 22 seats within channel member 14 and is welded thereto while the rear end of member 22 is welded to the rear portion of frame 10. It will be noted that the rear portion of frame 10 is inclined at an angle with respect to the forward portion and that the member 22 is suitably notched at 26 to receive the lower legs of channels 12 and 14 at the rear of frame 10. A plate member 28 is welded to the top surface of the forward portion of frame 10 and projects forwardly therefrom, as best shown in Fig. 2.

A channel member 30 is welded or otherwise fixedly secured at the forward edge of plate 28 and a similar channel 31 is fixedly secured to the rear portion of the frame 10. Channels 30 and 31 receive and are crimped upon the ends of a plurality of sinuous spring elements 32, each of which has a plurality of oppositely directed convolutions extending in the same plane. Springs 32 have an initial set by reason of which they tend to curl longitudinally through an arc of more than 180°. They are thus partially straightened out and held against curling by the spaced channel elements 30 and 31. As a result of this arrangement springs 32 always tend to return to the position shown after they have been deflected downwardly by the weight of a passenger; and this tendency to return to the position shown is sufficient to resiliently support the passenger's weight. The marginal springs 32 are reinforced against lateral movement by a heavy spring wire 33 as shown in Fig. 1.

A suitable upholstering padding 34, having backing layer 35 and a finished layer 36, rests upon the top surface of springs 32 and the edges of finished and backed layers are secured in the usual manner to a tacking strip 38 fastened on the under side of frame 10.

An upstanding bracket 40, which is generally U-shaped in cross-section is secured at the rear of frame 10 intermediate of the ends of the frame. The bracket 40 is provided with a pair of spaced rearwardly and outwardly directed side flanges 42 at its upper portion; and flanges 42 are provided at their extremities with lateral projection 44. The lower end of bracket 40 is welded to the back of channel 12 and extends forwardly at 46 as best shown in Fig. 2, beneath frame member 22, to which it is welded. Accordingly, bracket 40 in effect constitutes an integral continuation of the reinforcing member 22.

The seat is provided with a pair of independently pivoted back members which are identical to each other. Each back member comprises a tubular frame 48 of generally rectangular formation which is provided with a downwardly extending arm 50 having a forward projection 52 at its lower end. A pivot pin 54 fixedly secured to the frame 10 is journaled in the extremity of the forward projection 52 on arm 50; and a second pivot pin 56 projects through and is fixedly secured to the inner lower side of frame 48 and is journaled in the adjacent flange 42 of bracket 40. It will be noted that the inner pivot 56 of the seat back is positioned a substantial distance above and rearwardly of the outer pivot 54. The axes of the two pivot pins 54 and 56 are, however, in alignment with each other with the result that the seat back 48 is free to pivot about an outwardly, downwardly and forwardly inclined axis. This arrangement of the axis of pivotal movement makes it possible to swing the outer top corner of the seat back out of the doorway in order to provide ready access to the rear of the passenger compartment without swinging the inner top corner forwardly to the same extent. Thus the seat back can be swung forwardly even though the seat is occupied. The outward projections 44 on flanges 42 of bracket 40 engage the rear portions of the frames 48 above the pivot pins 56 to limit backward tilting of the seat back at the position shown in the drawing.

The seat back is provided at its upper and lower edges with a pair of channel members 58 similar to the channel members 30 and 31 previously described, which channel members carry a plurality of sinuous springs 60 which are similar to the springs 32 of the seat. The marginal springs 60 on each seat back are reinforced against lateral movement by a relatively heavy wire 62, having its lower end 63 crimped in the lower channel 58 and having its upper end secured to one of the upper convolutions of the marginal springs 60 by means of a clip 64. Each spring 60 is secured to the spring adjacent thereto by the means of a link 66, the links defining in effect an inextensible chain extending entirely across the seat back between the reinforcing wires 62. This arrangement prevents lateral movement of one spring 60 relative to another which might otherwise occur. A similar set of links may be used on springs 32.

As illustrated more specifically in Fig. 2, a tacking strip 130 has a projecting flange 131 made of metal which is welded to the lower cross bar 132 of the seat back frame 48. The upholstery element for the back frame 48 is formed of an outer trim cloth 133 having suitable padding 134 forwardly of the spring surface and a less amount of padding 135 on the rearward portion of the surface. The padding and trim cloth is formed into a pocket and drawn over the frame 48, the lower open end 136 being drawn over the tacking strip 130 and secured in position by tacks. This provides a simple and neat method of attaching the upholstery material to the back frame and the spring strips supported thereby.

In Figs. 3, 4, and 5 is shown a preferred although somewhat more expensive form of the invention. In this form the main frame 70 of the seat is formed of a rolled channel section of generally inverted V-shape, having flanges 72 crimped inwardly to retain a tacking strip 74 therein. The tacking strip may be formed in any suitable manner such as by packing a sheet metal channel 75 with paper or like material. Frame 70 is supported upon end plates 76, similar in construction to plate 18 described in connection with the first form of the invention. A central longitudinal reinforcing member 78 connects the forward and rear portions of frame 70 and is similar in construction to the frame 70. Reinforcing member 78 is welded at its ends to the frame 70 and is bent downwardly intermediate its ends to provide clearance for the sub-frame and springs hereinafter described.

The means for supporting the inner pivot pins for the seat backs comprises a sheet metal stamping 80, generally U-shaped in horizontal section and having crossed ends. The member 80 is held in upright position adjacent to the rear of the frame 70 by means of a bracket 82 shaped at its forward end to seat upon reinforcing member 78 and to extend over the adjacent portion of the frame 70. From that point the bracket 82 projects upwardly and is of U-form, having forwardly projecting legs 84 fitted in and welded to the member 80. The bracket above leg 84 is provided with outwardly projecting wings 86, the terminal portions of which project rearwardly. Above the wings 86 the bracket has an inwardly turned portion 88 projecting into and welded to the member 80. The bracket 82 is also welded to the reinforcing member 78 with the result that member 80 and bracket 82 are in effect integral extensions of the member 78.

The back frames 90 are pivoted on pins 92 carried by the member 80 at their inner sides and are pivoted at their outer sides on pins 94, carried by the frame 70 and journalled in forward projections on back frame arms 96, in the manner described in connection with the previous modification. The back frames are provided with sinuous springs 98 as in the prior form of the invention.

One of the important features of the form of the invention shown in Figs. 3 and 4, is a novel means for preventing relative lateral movement between the sinuous springs 98. It will be noted that each of the sinuous springs 98 is connected to the adjacent springs at a point intermediate their ends by means of links 99. In addition, each of the two marginal springs 98 are connected at a point substantially midway of their lengths to the frame member 90 by means of a short length of chain 100. Accordingly, the chains 100 and links 99, in combination with the sinuous springs 98, define a flexible nonextensible chain extending entirely across the seat back. As a result of this construction, it is impossible for one of the sinuous springs to move laterally with respect to adjacent springs or for two of the springs to assume an overlapping position. The chains 100 are only of sufficient length to permit normal fore and aft movement to which the adjacent sinuous spring 98 is subject during use.

Another important feature of this form of the invention resides in the means for mounting the sinuous springs of the seat. In this form, the sinuous springs 104 of the seat have their ends crimped in channels 106 and 107. A plurality of rigid channel members 108 are fixedly secured at their rear ends to the channel member 107 in any desired manner, such as by crimping as shown and additionally by welding, if desired. The forward ends of members 108 are pivotally secured to the channel 106 by means of wire elements 110 crimped in the forward extremities of channel 108 and having their forward ends bent at right angles and received in channel 106. Wire elements 110 may be journalled for rotation in the channel 106, if desired, but preferably, in order to avoid squeaking or the necessity of lubrication, elements 110 are tightly crimped in channel 106 and they are made of resilient spring wire. With this arrangement pivotal movement of members 108 with respect to the channel 106 is accompanied by bending of the flexible wire elements 110. The channel 106 is welded to the forward edge of frame 70.

As a result of the construction just described the channel 107 and members 108 define in effect a rigid sub-frame pivotally supported at its forward edge to the main frame 70 and upon this rigid sub-frame is carried the sinuous springs 104 which define the seating surface support. A pair of channel stringer members 112 and 113 are secured to members 108 in the manner best shown in Fig. 4 and extend the entire width of the seat. A similar pair of channel members 114 and 115 is secured to the main frame 70 immediately below the channels 112 and 113; and a plurality of coiled springs 116 are secured at their respective ends in the pairs of channel members by a crimping operation. Springs 116 perform the function of resiliently supporting the rear or free edge of the frame which carries sinuous springs 104. Accordingly there is provided a resilient support for the sinuous spring frame which provides a cushioning effect in addition to that provided by the sinuous springs 104. One of the principal advantages of this arrangement is the fact that while the sinuous spring sub-frame is resiliently supported by reason of the fact that its forward edge is in effect pivoted directly to the main frame 70, there is no possibility whatsoever of the spring sub-frame having any lateral or longitudinal movement relative to the main frame.

In the form of the invention shown in Figs. 3 and 4, the seat is provided with an upholstering padding formed of molded sponge rubber 117 over which is laid a finish upholstering material 118 which is secured in the usual manner at its edges to the tacking strip 74. It will be noted that the molded upholstering padding is formed of increased thickness above the forward edge of the seat, at which point the sub-frame is not resiliently supported, in order to compensate for the lack of resiliency at this point. When molded sponge rubber is used as the upholstering padding, any desired distribution of the padding thickness may be maintained at any given point. While in the form of the invention shown in Figs. 3 and 4, the forward edge of the sinuous spring sub-frame is shown pivoted to the main frame 70, it will be understood that many of the advantages of the invention may be secured by pivoting the sub-frame at the rear of the seat and resiliently supporting its forward edge.

In Fig. 5 is shown a somewhat modified form of the invention shown in Figs. 3 and 4, in which the coil springs 120 for supporting the rear edge of the sub-frame are supported at their lower ends in a channel member 122 carried by the main frame 126 and in a channel 124 formed integrally with the upper edge of the rolled section defining the main frame 126.

It will be apparent that there is provided according to the present invention, a superior form of automobile seat construction which is simple and inexpensive to manufacture and which has a number of advantages, including an improved means for tilting the back elements of the seat, improved means for resiliently supporting the sinuous spring seat frame, an improved means for preventing relative lateral movement between the sinuous spring elements, and other advantages. While several forms of the invention have been shown and described, it is apparent that others are available within the spirit of the invention as shown and described and within the scope of the appended claims.

What I claim is:

1. A border frame element for spring constructions comprising an elongated tubular metal member, an elongated sheet metal member extending along said tubular member, said sheet metal member being generally channel shaped with the walls of said sheet metal member crimped together at spaced points therealong to form wire engaging recesses, said sheet metal member having a base portion welded to said tubular member, and a tacking strip having a metal portion extending along said tubular member, said metal portion being welded to said tubular member.

2. A seat back construction including, in combination, a metal member in the form of an inverted U, a metal cross-member connected to said first member in spaced and substantially parallel relationship to the base of said U-shaped member, similar elongated sheet metal members of generally channel shape arranged facing each other and secured to the inner edge of said cross-member and the inner edge of the base of the U-shaped member respectively, both of said sheet metal members being crimped to form wire engaging recesses, elongated spring elements extending between said sheet metal members forming a spring surface, a tacking strip secured to the lower edge of said cross-member, and a cushioning member formed with a pocket therein which slides over and receives in said pocket the U-shaped member, the edges of said cushioning member adjacent the opening into the pocket overlying said cross-member and secured to said tacking strip.

NOBLE C. CLARK.